April 26, 1966 R. B. FROST ET AL 3,247,743

PIPE CUTTER

Filed Aug. 29, 1963 4 Sheets-Sheet 1

INVENTORS
RAYMOND B. FROST
EDWARD W. PIATEK
BY JOSEPH E. ST. CLAIR

ATTORNEY

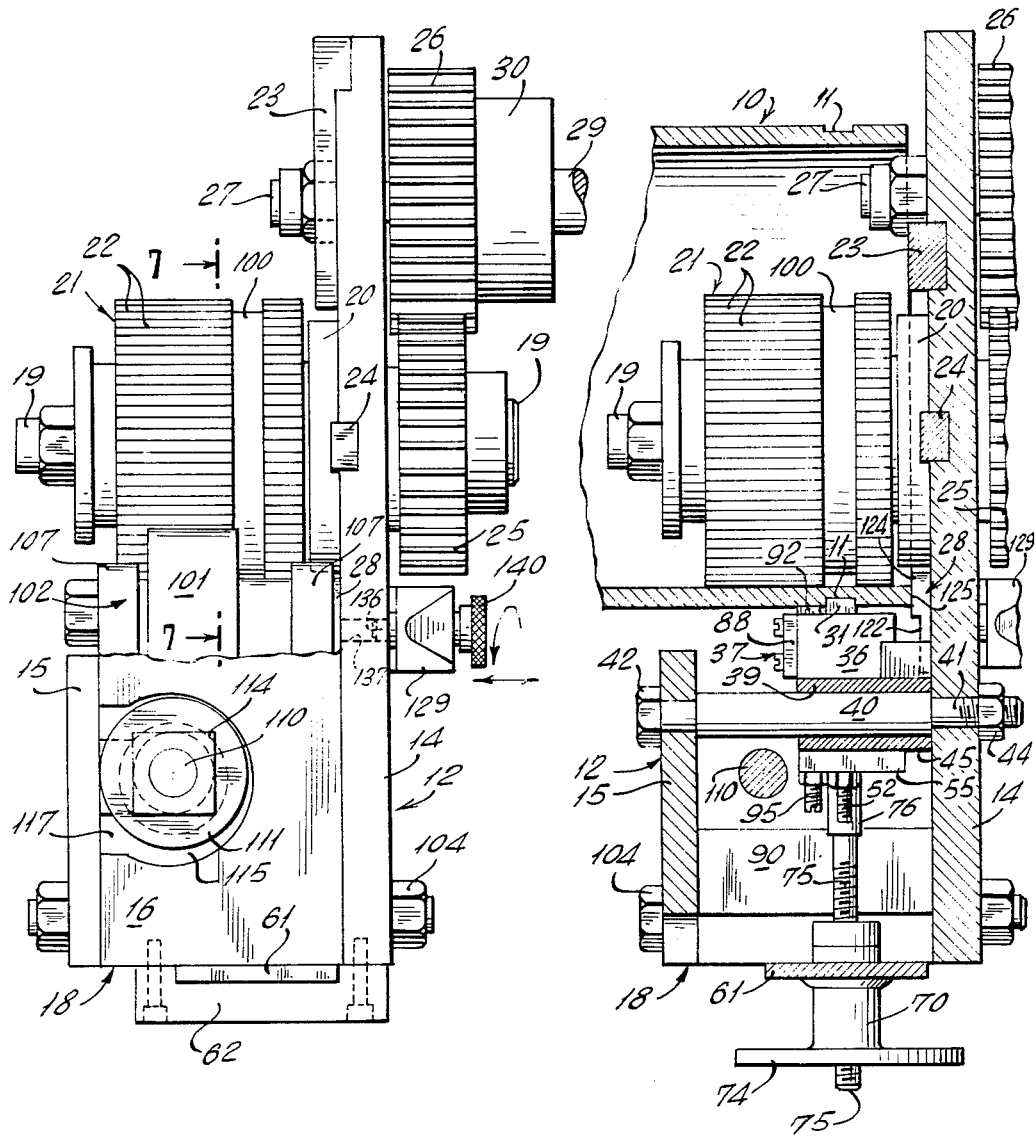

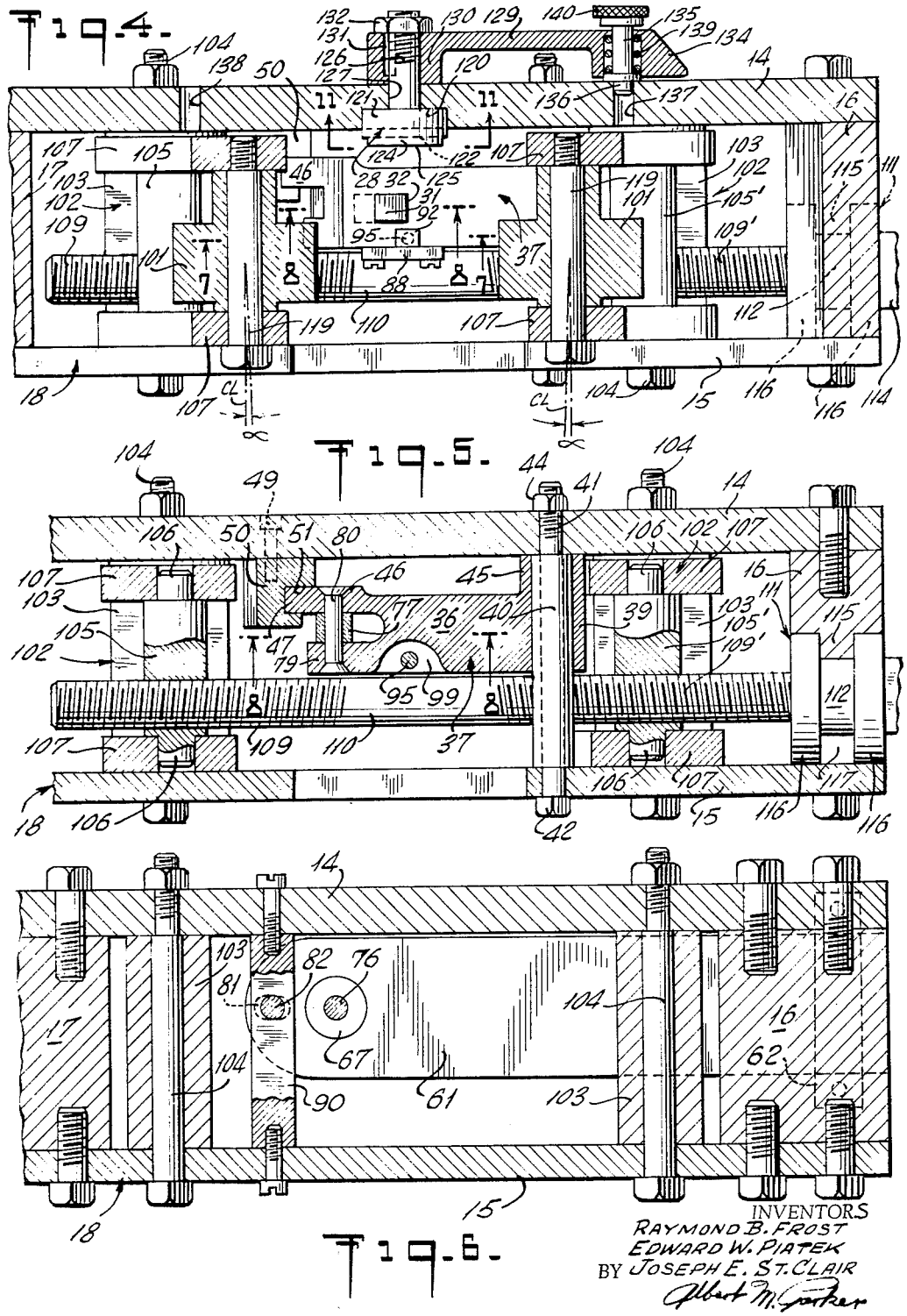

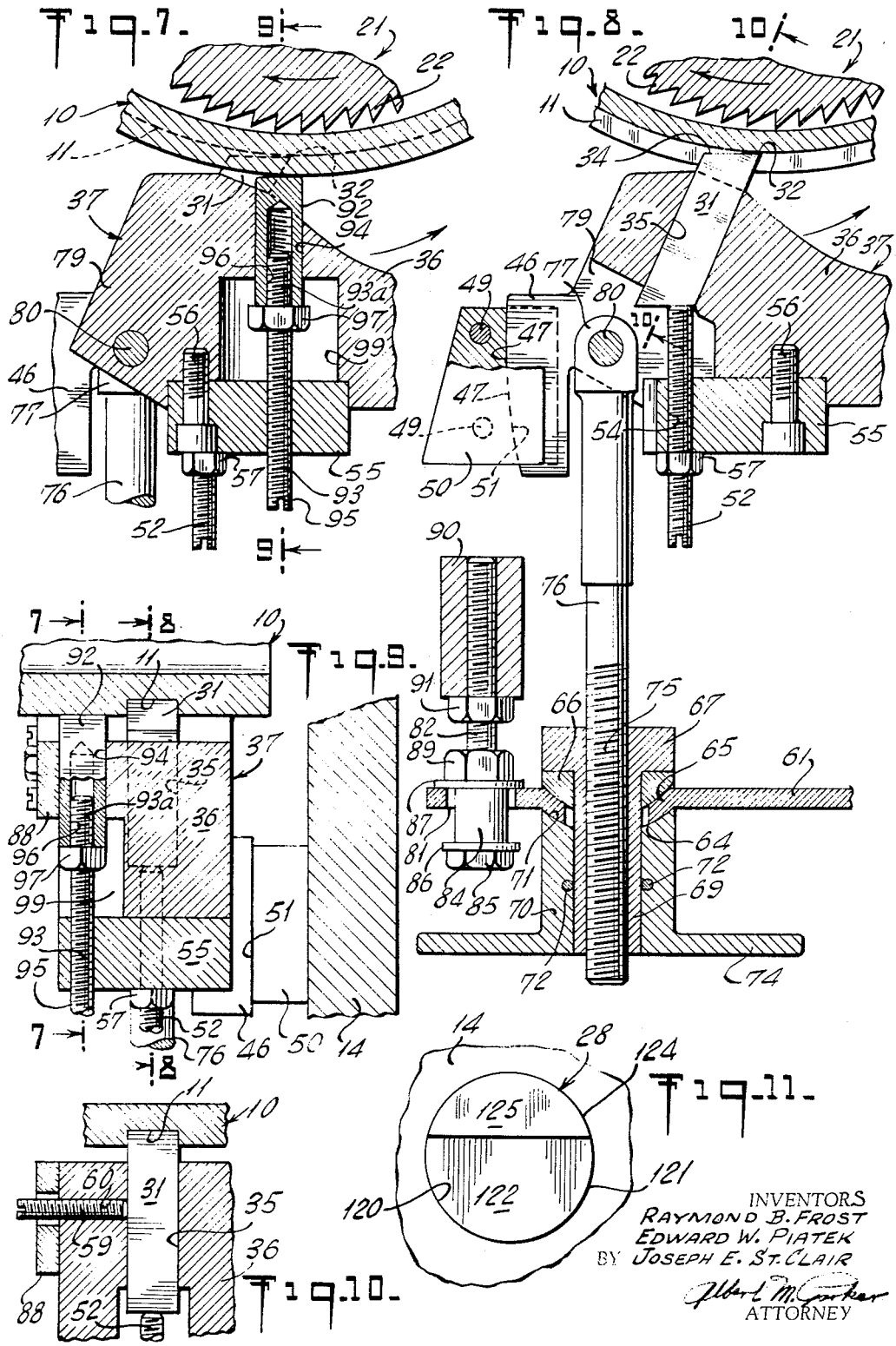

3,247,743
          PIPE CUTTER
Raymond B. Frost, Short Hills, Edward W. Piatek,
  Linden, and Joseph E. St. Clair, Madison, N.J., as-
  signors to Victaulic Company of America, Union, N.J.,
  a corporation of New Jersey
       Filed Aug. 29, 1963, Ser. No. 305,481
              27 Claims.  (Cl. 82—4)

This invention relates to apparatus for cutting or machining pipe, and is particularly concerned with an apparatus for the grooving or bevelling of a pipe.

The illustrative embodiment of apparatus of the invention is shown in connection with its use in the forming of a groove adjacent the end of a pipe. Such operation is performed, for example, on lengths of pipe which are to be joined by quickly assembled and disassembled couplings provided with pressure responsive sealing means whereby the seal is made increasingly secure upon the subjection of the joint to the fluid pressure within the conduit system. Such conduit systems are employed for the temporary supply of fluid such as in the irrigation of fields. The pipe grooving and cutting apparatus of the present invention is of such character that it may be readily employed in the field with only the addition of a pipe supporting and gripping means such as a vise.

The invention has among its objects the provision of a novel apparatus for providing annular grooves or shaping cuts in a pipe.

A further object of the invention is the provision of an apparatus of the character indicated which is of simple, rugged construction, is easily installed on a pipe, and is easily used by relatively unskilled operators.

Another object of the invention is the provision of a pipe grooving apparatus of such novel design that it is capable, by simple adjustment, of operating upon pipes within a wide range of diameters.

Yet another object of the invention is the provision of a pipe grooving apparatus the drive torque requirements of which are relatively low and substantially constant over the entire range of pipe diameters upon which the tool is adapted to operate.

Still a further object of the invention is the provision of a pipe grooving apparatus having a novel tool feeding means which is economical of space, has no tendency to jam, and may be initially set to provide the required tool feeding travel throughout the entire grooving operation.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of an illustrative preferred embodiment of a pipe grooving apparatus made in accordance with the present invention, the apparatus being shown operating upon a pipe shown in vertical transverse section, the apparatus being shown in phantom lines in one of the angularly displaced positions which it assumes during operation thereof, the figure also showing in phantom lines the outline of a second markedly larger diameter pipe upon which the apparatus is adapted to operate and the position of the outer pipe engaging guide rollers when they are adjusted to operate upon such larger pipe;

FIG. 2 is a view in end elevation of the apparatus of FIG. 1 when it is in the position corresponding to the full line position in FIG. 1, the view being taken from the line 2—2 of FIG. 1 in the direction of the arrows, the pipe being operated upon in FIG. 1 being omitted;

FIG. 3 is a fragmentary view in vertical section through the apparatus of FIG. 1, the section being taken along the line 3—3 of FIG. 1 in the direction of the arrows;

FIG. 4 is a fragmentary view in horizontal section through the apparatus of FIG. 1, the section being taken along the line 4—4 of FIG. 1 in the direction of the arrows;

FIG. 5 is a fragmentary view in horizontal section through the apparatus of FIG. 1, the section being taken along the line 5—5 of FIG. 1 in the direction of the arrows;

FIG. 6 is a fragmentary view in horizontal section through the apparatus of FIG. 1, the section being taken along the line 6—6 of FIG. 1 in the direction of the arrows;

FIG. 7 is a fragmentary view in section and on an enlarged scale of a portion of the apparatus in the vicinity of the pipe engaging grooving tool of the apparatus and showing such tool in operative engagement with a pipe, certain of the parts being shown in elevation, the section being taken generally along line 7—7 in the direction of the arrows of FIGS. 2, 4 and 9;

Figure 1:
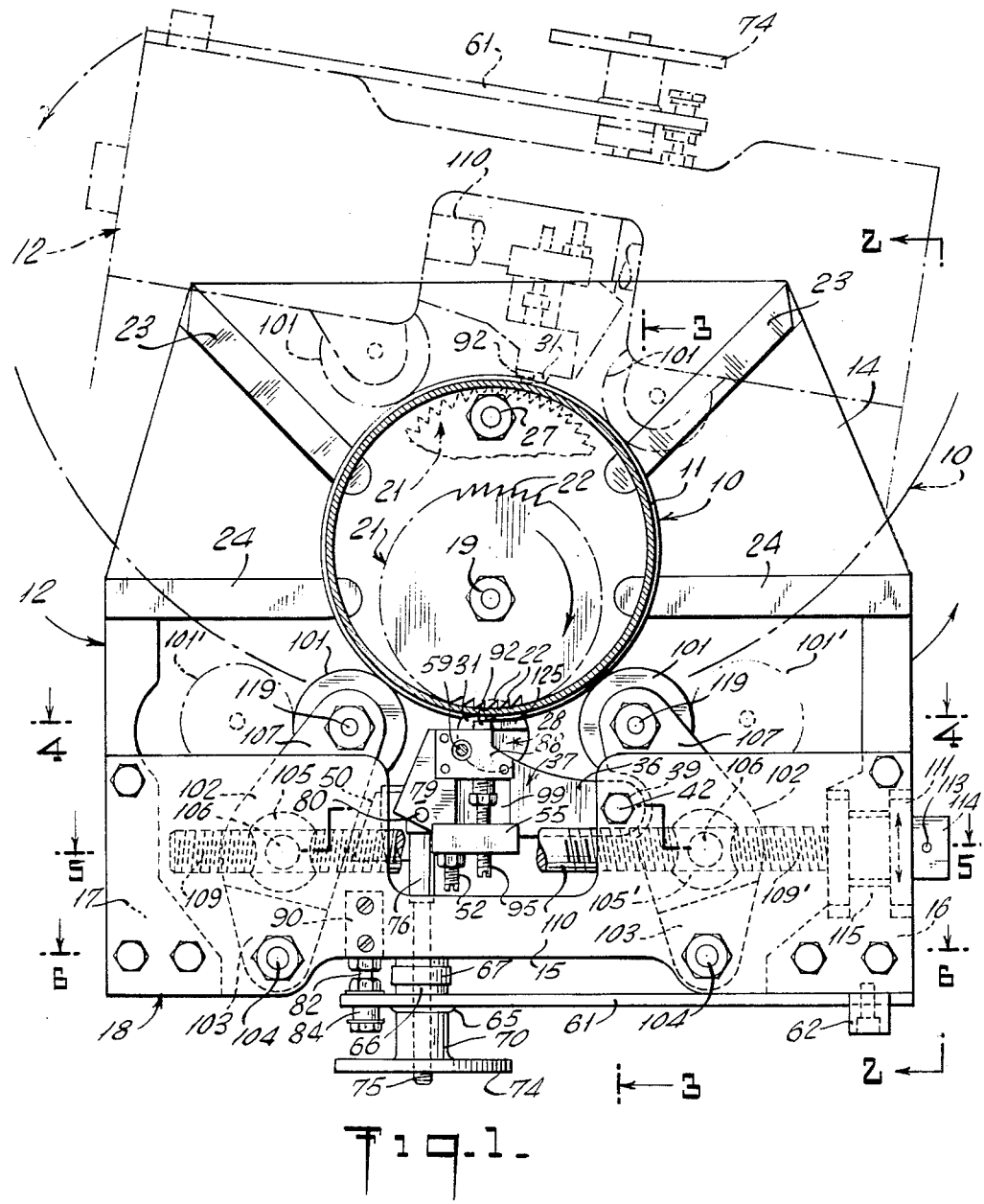

FIG. 8 is a view in vertical section through the apparatus of FIG. 1 in the vicinity of the cutting tool thereof, the section being on an enlarged scale and parallel to but inwardly of the section of FIG. 7, the figure also showing the portion of the tool feeding spring means of the apparatus and of the adjustable stop means therefor, certain of the parts being shown in elevation, the section being taken generally along the line 8—8 of FIGS. 4 and 9 in the direction of the arrows;

FIG. 9 is a view in vertical section on an enlarged scale through the portion of the apparatus in the vicinity of the pipe grooving tool, the section of FIG. 9 being at right angles to that of FIG. 7 and being taken along the line 9—9 of FIG. 7 in the direction of the arrows;

FIG. 10 is a fragmentary view taken along the axis of the pipe grooving tool and generally along the line 10—10 of FIG. 8 in the direction of the arrows, certain of the parts being shown in elevation; and FIG. 11 is a fragmentary view in elevation on an enlarged scale of the apparatus in the vicinity of the adjustable central pipe stop thereof, the view being taken from the line 11—11 of FIG. 4.

Turning now to FIG. 1 there is shown a pipe generally designated 10 which is being cut by the illustrative embodiment of apparatus to provide a circumferentially extending external groove 11 of square cross-section therein. Such groove, which is located adjacent the end of the pipe 10, may be for the purpose of receiving an annular flange of the housing containing a rubber-like sealing means of a quickly detachable coupling, such as that above generally described. In the following description it will be assumed that the pipe 10 is held in horizontal position and maintained from rotation about its axis by a suitable means (not shown) such as a vise, and that the cutting apparatus, which is generally designated 12, rotates about the pipe in the manner indicated in FIG. 1. Obviously the apparatus may also be operated so that it remains non-rotating and the pipe 10 rotates relative thereto, the same direction of relative rotation between the pipe and the apparatus being preserved.

The apparatus 12 has a frame generally designated 18 made up of a main rear plate 14, a forward plate 15 and transverse end members 16 and 17 connecting plates 14 and 15 and maintaining them in spaced parallel relationship. The plate 14 has a bottom portion thereof, as shown in FIG. 1, of generally rectangular shape, the upper portion of the plate being generally in the shape of a truncated triangle. The forward plate 15 is generally of rectangular shape, having a height somewhat less than that of the bottom portion of plate 14. In addition, plate 15 is centrally apertured so as to expose the cutting tool and the means limiting the depth of cut made by the tool for easy adjustment in a manner to be explained. A stub shaft 19 is mounted for rotation in a suitable bearing 20 affixed to plate 14, the shaft being located laterally centrally of the plate 14 and at the top of its rectangular bottom portion. Shaft 19 lies with its axis in a horizontal plane as the apparatus is shown in full lines in FIG. 1. The axis of the shaft 19 is tipped at a small angle, for example, ½ degree, to the left in the direction outwardly from the paper of FIG. 1. Affixed to the forward position of shaft 19 as by being keyed thereto is a serrated pipe-engaging roller 21 of generally circular cylindrical shape. Roller 21 is provided with sharp buttress type teeth 22 which are inclined in the direction shown in FIG. 1 so as to have a positive driving engagement between the teeth and the inner surface of the pipe when the roller 21 rotates relative to the pipe in the direction of the curved arrows in FIG. 1. The pipe 10 which is to be cut by the apparatus has a diameter which somewhat exceeds that of the roller 21. The pipe is introduced into the apparatus so that its end is telescoped over the roller 21, the depth of such telescoping engagement being limited, depending upon the range of diameter of the pipe, by oppositely disposed aligned abutment bars 24 which are mounted upon and secured to the plate 14 in substantial alignment with shaft 19 in the manner shown in FIGS. 1 and 2, and one step of a two-step pipe end stop member 28, to be described, or by two oppositely angularly disposed stop bars 23, mounted upon the upper part of plate 14, as shown, and the other step of the stop member 28.

The stub shaft 19 has a first pinion 25 secured thereto for rotation therewith, the pinion 25 meshing with a second pinion 26 in which the embodiment shown has the same diameter as pinion 25. Pinion 26 is rotatably mounted on a stub shaft 27 which is fixedly secured to plate 14. Pinion 26 is rotated by means of a shaft 29 which is secured to the pinion 26 as by a hub 30. Shaft 29 may be rotated either manually as by a crank (not shown) affixed thereto or by suitable power means such as a motor or engine connected to it. As will be more clearly understood in the following description, assuming the pipe 10 is held from rotation about its axis, when the shaft 29 is rotated counterclockwise as it would appear from the point of view of FIG. 1 the serrated roller 21 rotates in a clockwise direction and the frame 18 of the apparatus including the plates 14 and 15, the end members 16 and 17 and the cutting tool and guiding rollers, to be described, rotating in a counterclockwise direction as indicated in FIG. 1.

The frame 18 of the apparatus as above indicated provides means for supporting, feeding and guiding a pipe cutting tool, and means providing guide means, specifically adjustable rollers, engaging the outer surface of the pipe so as accurately to locate the plane in which the cutting tool travels with respect to the axis of the pipe. As perhaps most clearly shown in FIGS. 8 and 10, the cutting tool 31 is similar in shape to a lathe tool employed to make a square groove in a body or revolution in one tool feeding pass generally radial of such body. Thus the tool has a width which is equal to the width the groove 11 desired, has a forward cutting edge 32, and has a rear surface 34 extending at an acute angle to the length of the tool to provide the necessary relief for the cutting edge 32 of the tool. The tool 31 is adjustably held in a socket 35 in the body 36 of a tool holder generally designated 37.

The tool holder 37 is generally in the form of a lever arm which is pivotally mounted at its right hand end (FIG. 1) which is in the form of a journal 39 which is telescoped about a sleeve 40 on a fixed horizontal shaft 41 which extends through and is affixed to plates 14 and 15, as shown most clearly in FIG. 5. The sleeve 40 functions not only as a bearing for journal 39 on the end of the lever, but also functions as a spacer for plates 14 and 15. The ends of shaft 41 extend through holes in plates 14 and 15 and are secured thereto respectively by a head 42 of the shaft and a nut 44 thereon. The journal 39 on the right hand end of the tool holder 37 is extended at 45 as shown, to provide long bearing structure so as accurately to pivot the tool holder 37 on the sleeve 40. Thus the tool holder 37 is firmly held by such bearing against deflection from the desired plane of cut as the tool operatively engages the pipe 10.

In order still more positively to guide tool holder 37 there is provided a further guide means therefor as shown in FIGS. 4, 5, 8, and 9. The body 36 of the tool holder has a portion 46 thereon which projects toward the forward face of plate 14. The portion of projection 46 remote from the shaft 40, 41 is provided with an arcuate wing 47 which is coaxial with shaft 40, 41. Affixed to the forward face of plate 14 by machine screws 49 is a block 50 having an acruate groove 51 which guidingly receives the wing 47 on projection 46. Thus the tool holder 37 is accurately held in a vertical plane as it pivots toward and away from the pipe 10 about the shaft 40, 41.

The tool 31 is adjustable lengthwise of a socket 35 in which it is held in the body 36 of the tool holder by means of an adjustable abutment screw 52 which is threadedly engaged in a vertical passage 54 in a block 55 which is secured to the lower part of body 36 of the tool holder as by machine screws 56 (FIGS. 7 and 8). In the embodiment shown, the socket is located in the tool holder so that the cutting edge of the tool engages the pipe 10 at substantially the vertical axial plane of the pipe, and the length of the tool extends generally radially toward such pipe. It is to be understood that such disposition of the tool is capable of considerable variation consistent with sound metal cutting tool practice. The adjustment screw 52 engages the lower surface of the tool 31 which is made double-ended to provide alternatively used cutting edges, thereby to adjust the length of the tool which projects from the body 36, and thus to adjust the depth of the cut or groove 11 made by the tool. The screw 52 is held in adjusted position by a lock nut 57. The tool is further held in longitudinally adjusted position, and against chattering in its socket, by a set screw 59 (FIG. 10) which has threaded engagement with a passage 60 in the side of the body 36 and extends inwardly into engagement with the shank of the tool.

The tool holder 37 is constantly urged clockwise (FIG. 1) so as to thrust the tool 31 into cutting engagement with the pipe 10 by the following mechanism. A flat horizontal leaf spring 61 is held at its right hand end by a bracket 62, which is affixed to the lower edge of plate 14 and end member 16 by machine screws, as shown. The spring 61 is provided near its left hand end with a hole 64 and an upwardly concave, part-spherical seat 65 surrounding the hole, as shown in FIG. 8.

Disposed within seat 65 is a bearing washer 66 having a lower surface complementary to seat 65. Washer 66 is mounted beneath the head 67 on an internally threaded sleeve 69, such sleeve extending through hole 64 with substantial clearance. An outer sleeve member 70 having a part-spherical seat 71 on its upper end engages the lower part-spherical surface of the portion of spring 61 surrounding the hole 64. Sleeve member 70 is affixed to sleeve 69 by pins 72, as shown, whereby the two sleeves 69 and 70 function as an integral member after their assembly. Sleeve member 69, 70 is provided with a head adjusting wheel or knob 74 by means of which the composite sleeve 69, 70 may be rotated about its axis to vary the thrust which spring 61 exerts upwardly on the tool 31 through the following mechanism.

The threaded inner surface of portion 69 of the composite sleeve 69, 70 has threaded engagement at 75 with the lower end of a tool adjusting rod member 76. The upper end 77 of the rod 76 is in the form of an ear and is received between parallel ears 79 on the left hand end of body 36 to form a clevis joint, such joint being completed by a pivot pin 80 which extends through ears 79 and the upper portion of the rod.

The described adjustable connection between the leaf spring 61 and the rod 76 permits the force which the spring exerts upon the tool holder, and thus that with which the tool 31 is thrust against the pipe, to be adjusted as we have seen. The extent of movement of the outer end of the spring 61 is adjusted by a mechanism most clearly shown in FIG. 8. As there shown, the outer end of spring 61 is provided with a hole 81 therethrough. Through hole 81 there extends the lower end of a headed stud 82 having a smooth surface sleeve 84 telescoped thereover. Between the lower end of sleeve 84 and the head 85 on stud 82 there is disposed a washer 86 having a diameter greater than that of hole 81. A second somewhat larger diametered washer 87 is disposed above sleeve 84 and between it and a nut 89 adjustably mounted on stud 82. Stud 82 is adjustably secured to a cross member 90 which is affixed to plates 14 and 15, as shown in FIG. 6, the vertical position of stud 82 with respect to member 90 being adjustable by screwing the stud up and down and then locking it in adjusted position by a lock nut 91 which engages member 90. The thus adjusted spaced washers 86 and 87 provide the desired range of the force with which spring 61 urges the tool 31 against pipe 10.

The tool holder is further provided with an accurately adjustable stop means which prevents the further feed of the tool 31 radially inwardly of the pipe 10 when the tool has produced a groove 11 of the desired depth in the pipe. Such depth limiting means is shown in FIGS. 4, 7 and 9. Such further stop means consists of a member 92 of rectangular cross-section which accurately fits and is slidably mounted in a generally vertical passage 94 in the tool holder 37 forwardly of tool 31 with is longitudinal axis generally aligned with the cutting edge 32 of the tool 31, as shown in FIG. 4. The upper end of stop member 92 thus confronts a zone of the pipe 10 longitudinally spaced from groove 11. Such disposition of the member 92 relative to the tool 31, as shown in FIG. 7, permits the radial depth of the groove 11 to be determined with great accuracy.

In the embodiment shown, the passage in the body 36 of the tool holder is formed with a groove in the forward edge of such body, the groove being bridged by a plate member 88 affixed to body 36. Member 92 is vertically adjusted with respect to the tool holder 37 by means of a machine screw 95 which has threaded engagement with the above-mentioned block 55, and has an upper end thereof threadedly received within a blind passage 96 extending axially upwardly from the bottom of member 92. The screw thread 93 on the bottom of screw 95 received in block 55 is of different pitch from but of the same hand as the thread 93a threadedly engaged with member 92. Thus when the screw 95 is turned a differential adjusting action of member 92 is obtained. If, for example, thread 93 has a pitch of 20 to the inch and thread 93a has pitch of 28 to the inch, the member 92 will be advanced or retracted, as the case may be, in an amount of .0143 per revolution of screw 95. This permits stop member 92 to be adjusted with great accuracy relative to the cutting edge 32 of the tool 31, and thus the groove 11 to be cut to a very accurate predetermined depth.

Member 92 is held in the desired vertical position, determined by the turning of screw 95, by a lock nut 97 which is mounted on screw 95 and may be turned into tight, locking engagement with the lower end of member 92. To permit ready access to the nut 97 and to allow its turning the lower end of member 92 and the nut 97 are disposed within a laterally open hollow or depression 99 in the body 36 of the tool holder, as shown.

The cutting edge 32 of tool 31 and the upper end of the stop member 92 are, as noted, fixed in substantial alignment with respect to each other. Such members remain at all times near the portion of serrated roller 21 which most closely approaches and drivingly engages the inner surface of the pipe 10. As shown in FIGS. 2 and 3, the tool 31 is aligned with roller 21 so as to lie beneath a portion of such roller intermediate its length. Thus the cutting thrust exerted upon the pipe 10 by the tool 31 is substantially directly absorbed and countered by roller 21 acting through the portion of the wall of the pipe 10 which directly confronts the cutting tool. Thus distortion of the parts of the apparatus and of the pipe by the action of the tool in making the cut or groove therein is minimized. Preferably the roller 21 is provided with an annular peripheral groove 100 disposed in alignment with and somewhat wider than the tool 31. The provision of such groove prevents any chance engagement of the cutting edge 32 of the tool with any of the teeth of the roller 21, as when the apparatus is being transported with no pipe 10 or protective member interposed between the tool and the serrated roller. Such groove 100 also permits the apparatus to be employed, if desired, to extend the groove 11 completely through the wall of the pipe to cut an end portion completely from a pipe, as in removing a damaged end therefrom.

As noted, the end of the pipe 10 is mounted in position to be cut, as shown in FIGS. 1 and 3. Such engagement between the pipe and the alternatively operative end stop bars 23 and 24 steadies the apparatus in its mounting on the pipe, and aids in preventing any tipping of the apparatus out of the desired transverse plane of the groove 11 to be cut in the pipe. The apparatus is further steadied and located on the pipe by adjustable idle guide rollers 101 which are mounted on horizontal axes on opposite sides of and at equal distances from the vertical plane substantially containing the axis of the pipe 10 and the axis of the serrated roller 21. Rollers 101, which have pipe engaging surfaces lying intermediate the length of the serrated roller 21, are mounted on means to be described, whereby they approach each other to a degree shown in solid lines in FIG. 1, or even somewhat closer, and may be retracted from each other to positions indicated in phantom lines in FIG. 1 and designated 101', or even further. Such adjustment of the guide rollers 101, taken with the described manner of adjustment of the tool holder 37 and of the tool 31 held thereby, permits the apparatus shown to perform cuts upon pipes having diameters lying within a wide range. One design of apparatus in accordance with the invention, for example, operates upon pipes having diameters in the range from 7 to 24 inches.

The rollers 101 are mounted upon shafts 119 on the upper ends of generally similar but oppositely facing bifurcated arms 102 the bored solid lower ends 103 of which are pivotally mounted upon horizontal pivot pins 104, which extend through and are secured to the plates 14 and 15. Intermediate the length of each of the arms 102 there is provided a nut 105 which is horizontally pivotable with respect to its arm by reason of its mounting on oppositely projecting trunnions 106 which extend into passages in the spaced parallel members 107 integrally attached to and extending upwardly from the lower portion 103 of the member 102.

The threaded passages in the nuts 105 and 105' are of opposite hand and are threadedly engaged with screw threads 109 and 109' of opposite hand on a horizontal screw shaft 110. The right hand end of shaft 110 (FIG. 1) is vertically slidably mounted in end member 16 while being held from movement longitudinally of shaft 110 and also in the direction normal to the paper of FIG.

1. Such mounting of the right hand end of the shaft 110 is provided by a collar 111 which is generally H-shaped in section and which is mounted on the shaft as shown in FIGS. 4 and 5, the collar 111 having a passage longitudinally therethrough receiving the unthreaded cylindrical end portion 112 of the shaft to which it is secured by a pin 113. The head 114 of collar 111 is square in section and lies exposed to the right of the end member 16, and provides a means whereby the shaft 110 may be turned. Collar 111 is mounted for vertical movement in a guideway provided in end member 16, such guideway being formed as a forwardly open, vertically elongated, generally arcuate slot 117 in member 16, the member 16 being counterbored on both sides to provide a tongue 115 disposed in a vertical plane and projecting into and accurately fitting the space between the flanges 116 at the ends of the collar 111. The forward plate member 15 closes the forward end of slot 117 and guidingly engages the flanges 116 on collar 111. The described guiding means 111, 118, etc. permits the shaft 110 to rise and descend as the nuts 105 move vertically upon adjustment of the rollers 101.

In order to assure the maintenance of one of the steps of stop member 28 and stop bars 23 or 24, as the case may be, against the end of pipe 10, the shafts 119 upon which the guide rollers 101 are mounted are preferably inclined somewhat in their common horizontal plane. Thus, as the apparatus is shown in FIG. 4, the right hand shaft 119 is inclined downwardly toward the paper and to the left at an angle α and the left hand shaft 119 is inclined upwardly from the paper and to the left at an angle α. The angle of such tipping is small, for example, on the order of one degree; that is all that is necessary to assure that the rollers 101 in acting upon the pipe 10 will thrust frame 18 in the direction out of the paper of FIG. 1 to maintain the chosen step of member 28 and the stop bars 23 or 24 thereon against the end of the pipe, when the parts of the apparatus are rotated in the direction indicated by the arrows. The teeth 22 on serrated roller 21, being disposed at only a small angle with respect to the axis of the roller, as shown, permit any necessary axial sliding of frame 18 relative to pipe 10 under the influence of rollers 101 to maintain the chosen step of member 28 and either bars 23 or bars 24 in engagement with the end of pipe 10.

The member 28, as generally indicated above, is adapted selectively to cooperate with bars 23 and 24 to position the cutter 31 at either of two predetermined distances from the end of the pipe being cut. Thus in one embodiment of the apparatus it is desired that the groove 11 shall be at a distance of ¾" from the end of the pipe when the pipe is of smaller diameter, for example, when the diameter lies in the range from 7" to 12", and that the groove 11 shall be at a distance of 31/32" from the end of the pipe when the diameter of the pipe lies in the range of from 14" to 24". The stop bars 23 are thicker than bars 24, the forward, pipe-engaging surfaces of bars 23 lying in a plane 7/32" forwardly of the forward surfaces of bars 24 in the above described embodiment of the apparatus. The stop bars 23 are so disposed and of such length generally radial of roller 21 that they are engaged by the end of any pipe having a diameter in the range of from 7" to 12", but that the end of a pipe having a diameter of 14" or greater will extend outwardly beyond the outer ends of bars 23. In such latter diameter range, therefore, pipes engage the stop bars 24.

The stop member 28 has selectively employed steps, the end surfaces 122 and 125 of which lie in the plane of the forward surfaces of stop bars 24 and 23, respectively. Member 28 has a circular cylindrical body portion 121 which is rotatably supported in a counterbore 120 at the inner end of a bore 127 through plate 14. A portion of the forward end of body 121 is cut away along a chordal plane above the axis of the body 121 as it is shown in FIGS. 1, 3, and 11, to form a further forwardly projecting part 124. As shown, the forward surface of body 121 forms the step 122, and the forward surface of part 124 forms the step 125.

The member 28 is formed as an integral part of a shaft 126 which is journalled in bore 127. Rearwardly of plate 14 there is disposed a lever 129 having a hollow boss 130 at one end thereof which receives the outer end of shaft 126, the shaft and lever being non-rotatably connected by a key 131 between the shaft and the boss and a nut 132 on the threaded outer end of the shaft. Member 28 is alternatively turned by lever 129 so that the step 122 or the step 125 cooperates with the end of the pipe being cut. The lever is retained in a selected one of such two positions by a pin 135 which is mounted in a thickened outer end portion 134 of the lever. Pin 135 has a forward end portion 136 of reduced diameter which is selectively received in one of two holes 137 and 138 in plate 14, such holes being located on a diameter of bore 127 and on opposite sides of such bore. The pin is constantly urged toward plate 14 by a coil compression spring 139 which acts between a collar on the pin and the inner end wall of the core in portion 134 of the lever receiving the pin 135 and spring 139 telescoped about the pin. The end 136 of the pin 135 may be retracted from hole 137 or hole 138, as the case may be, by pulling the pin away from plate 14 by grasping a knob 140 on the rear end of the pin.

When pipe 10 is to be grooved by the apparatus shown, the shaft 110 is turned in such direction as to open the guide rollers 101 sufficiently to receive such pipe. The end guide member 28 is turned to the correct position dictated by the diameter of the pipe to be grooved. Hand wheel 74 will have been turned in such direction as to retract the tool 31 from the path of entry of the pipe into the apparatus. The pipe 10 is now introduced over the serrated roller 21 so that the end of the pipe abuts the bars 23 or 24, again depending upon the diameter of the pipe. With the apparatus thus held on the pipe, the shaft 110 is turned in such direction as to cause the rollers 101 to approach and then to engage the pipe 10 firmly enough for the teeth 22 on roller 21 to dig into the inner surface of the pipe. The hand wheel 74 is now turned to raise the tool 31 into engagement with the outer surface of the pipe; such action will cause the free end of the leaf spring 61 to be depressed until it approaches within about ⅛" of the washer 86. The apparatus is now ready for use. As above explained the turning of driving shaft 29 in a counterclockwise direction causes the roller 21 drivingly engaged with the pipe 10 to rotate clockwise (FIG. 1) and the frame 18 of the apparatus upon which the cutting tool, depth gauge, and guide rollers 101 are mounted to rotate in the opposite direction, that is, counterclockwise.

The pipe grooving apparatus of the present invention is characterized by the high degree of accuracy with which it locates and forms the shaping cut or groove in the pipe. This is of particular advantage when the pipe is grooved for cooperation with a quickly assemblable coupling of the type above indicated, since the alignment of a coupling relative to the pipe sections which it joins and its axial positioning relative to such pipe sections depend upon the engagement of annular flanges on the housing of the coupling within the grooves on the confronting ends of the pipe sections.

Although the apparatus has been shown and described in connection with its use in the forming of a groove in a pipe, it is to be understood that with small modifications it will be employed in the forming of other shaping cuts on a pipe, such as the bevelling of the end of the pipe. For this purpose, the configuration of the cutting tool and its location relative to the end of the pipe may be changed, if necessary. Also, if desired, the bars 23 and/or 24 may be made adjustable in a direction normal to plate 14 and parallel to the axis of the pipe. The apparatus shown and described may be employed, with suitable adjustment of the depth stop, to cut the pipe end completely off if desired. As above pointed out, the provision of the groove 100 in the roller 21 makes such operation possible without injury to the cutting tool or to the roller 21.

In the illustrative embodiment of the apparatus the frame 18 is driven relatively around the pipe 10 through the reversing gears 25, 26. This enables the driving torque to be applied in the same direction as the rotation of the frame about the pipe, so that the load on the driving roller 21 is almost wholly relieved.

The pivoted tool support employed in the illustrative embodiment of apparatus is of advantage for a number of reasons. Its construction is such that no additional means need be provided to prevent the tool 31 from taking too deep a cut as it is traversed inwardly from the outer surface of the pipe toward the radially inner terminus of its traverse. The angular position of the tool support 36 does not change greatly during the total inward traverse of the tool 31 in cutting a groove. Thus, the force with which the spring 61 urges the tool 31 against the pipe is to all intents and purposes substantially constant once the means 65–75, etc. has been suitably adjusted. Should the tool momentarily tend to take too deep a cut, the reaction on the tool forcing it radially outwardly of the pipe will increase, and the tool will thus be thrust outwardly against the yielding force imposed thereon by spring 61.

The cutting thrust imposed by spring 61 upon the tool, and thus the opposite thrust imposed upon the tool by the pipe, may reach magnitudes as high as 800 lbs. These forces react about a pivot, and not against or partially against a flat surface, as is the case in prior pipe groovers wherein the tool slides in a guideway in a tool support during its radially inward feeding travel. The pivotal mounting of the tool support eliminates the high frictional resistance to feeding travel of the tool which is inherent in such prior pipe groovers, as well as any pronounced tendency of the tool or tool support to cock or bind in its guides.

Although only a limited number of embodiments of the invention have been illustrated in the accompanying drawing and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

What is claimed is:

1. Apparatus for forming an annular cut about a pipe which comprises a frame, a roller rotatably connected to the frame for forcibly contacting and backing up one surface of the pipe wall at a zone thereof, and a cutter supported on the frame for engaging and cutting the opposite surface of the pipe wall at a zone directly radially opposite the roller.

2. Apparatus for forming an annular cut about a pipe which comprises a frame, a roller rotatably connected to the frame for forcibly contacting and backing up one surface of the pipe wall at a part-annular transverse zone thereof, and a cutter supported on the frame for engaging and cutting the opposite surface of the pipe wall at a zone directly radially opposite the roller.

3. Apparatus for forming an annular cut about a pipe which comprises a frame, a roller rotatably connected to the frame for grippingly contacting the inner surface of the pipe at a part-annular transverse zone thereof, and a cutter supported on the frame for engaging and cutting the outer surface of the pipe at a zone directly radially opposite the roller.

4. Apparatus as claimed in claim 3, wherein the roller for grippingly contacting the inner surface of the pipe has a diameter somewhat less than the inner diameter of the pipe and is mounted with its axis substantially parallel with the axis of the pipe, and comprising means for driving the rotatable means, whereby to rotate said rotatable means and the frame relative to the pipe.

5. Apparatus as claimed in claim 4, wherein the driving means comprises a shaft mounted on the frame eccentric of and generally parallel to the axis of the roller, and means connecting the roller for rotation by the shaft.

6. Apparatus as claimed in claim 4, comprising guide means mounted on the frame and contacting the outer surface of the pipe at substantially equal distances on opposite sides of the plane containing the axis of the roller and the zone of the roller contacting the inner surface of the pipe, the roller and guide means holding the pipe with its axis in a fixed position relative to the frame.

7. Apparatus as claimed in claim 6, wherein each of the guide means comprises a further roller mounted with its axis oriented with respect to the axis of the pipe gripping roller.

8. Apparatus as claimed in claim 7, comprising stop means on the frame adapted to be engaged by a transverse surface of the pipe to locate the cutter at a desired distance from the end of the pipe, and wherein at least one of the further guide rollers is inclined in the plane generally containing the axes of the further guide rollers so that as the frame and further guide rollers rotate relative to the pipe the frame is thrust axially of the pipe to maintain the stop means on the frame in engagement with the said transverse surface of the pipe.

9. Apparatus as claimed in claim 6, comprising means mounting the guide means for equal adjustment in opposite directions toward and away from the plane containing the axis of the gripping and driving roller, the cutter, and the zone of the gripping and driving roller contacting the inner surface of the pipe.

10. Apparatus as claimed in claim 9, wherein the means mounting the guide means includes oppositely disposed arms pivotally mounted on the frame on opposite sides of said plane, each arm mounting a respective guide means thereon at a location spaced from the zone of pivotal mounting of the arm, and means to swing the arms through equal angles toward and away from each other.

11. Apparatus as claimed in claim 10, wherein the means to swing the arms comprises a screw shaft carrying threads of the same pitch and opposite hand on spaced zones thereof, and nuts mounted on the arms threadedly engaging the threads on the respective zones of the screw shaft.

12. Apparatus as claimed in claim 11, wherein the nuts are pivotally mounted on the arms with the pivotal axis of each nut fixed with respect to its arm, and the screw shaft moves in a plane toward and away from the pipe gripping roller, and comprising means for retaining the screw shaft in said plane and for retaining it from endwise motion while permitting its travel in said plane.

13. Apparatus for forming an annular cut about a pipe which comprises a frame, means for mounting the frame on a pipe and for rotating it in a plane relative to the pipe about the axis of the latter, a tool support mounted on the frame, a tool on the tool support, the tool support being in the form of a lever lying generally in a plane parallel to the plane of the annular cut to be made in the pipe, means mounting the lever for oscillation about an axis parallel to the axis of rotation of the frame substantially spaced from the tool, and means adapted to thrust the tool support with the tool mounted thereon in a tool feeding movement toward the pipe, and means in addition to the pivot means for guiding the tool support in its tool feeding movement, said further guide means comprising interengaging cooperating means on the frame and tool support substantially spaced from the pivotal axis of the latter for restraining the tool support from tipping out of its plane of oscillation.

14. Apparatus as claimed in claim 13, wherein the additional guide means for the tool support comprises an arcuate tongue member and a member having an arcuate groove accurately receiving the tongue member, the arcs of the tongue and groove being coaxial of the pivotal axis of the tool support, one of the tongue members and member having the groove being secured to the frame and the other of said members being secured to the tool support.

15. Apparatus for forming an annular cut about a pipe which comprises a frame, means for mounting the frame on a pipe and for rotating it in a plane relative to the pipe about the axis of the latter, a tool support mounted on the frame, a tool on the tool support, means on the frame mounting the tool support with the cutter carried thereby toward and away from the pipe and means to thust the tool support in a tool feeding stroke toward the pipe, said last named means comprising an elongated leaf spring, means securing a first end of the spring to the frame at a location remote from the tool support, and means connecting the second end of the spring to the tool support so as to stress the spring thereby resiliently to force the tool in a feeding stroke relative to the pipe with a force which remains within a narrow range of values after a single initial setting of the stress of the spring against the tool support.

16. Apparatus as claimed in claim 15, comprising means for variably stressing the spring, whereby to adjust the force with which the spring thrusts the tool toward the pipe.

17. Apparatus as claimed in claim 16, wherein the spring is fixedly connected at its first end to the frame, and comprising means adjustably connecting the second end of the spring to the tool support.

18. Apparatus as claimed in claim 16, comprising adjustable means mounted on the frame cooperating with the second end of the spring to limit the stroke of the second end of the spring.

19. Apparatus for forming an annular cut about a pipe which comprises a frame, means for mounting the frame on a pipe and for rotating it in a plane relative to the pipe about the axis of the latter, a cutter support mounted on the frame, a cutter on the cutter support, means on the frame mounting the cutter support with the cutter carried thereby toward and away from the pipe means, means to thrust the cutter support in a cutter feeding stroke toward the pipe, and abutment means on the cutter support adapted to engage a surface of the pipe adjacent the cut made therein by the cutter to stop the feeding of the cutter toward the pipe.

20. Apparatus as claimed in claim 19, wherein the abutment means is in the form of a threaded stud threadedly received in the cutter support in substantial alignment with the cutting edge of the cutter longitudinally of the pipe.

21. Apparatus as claimed in claim 20, comprising means for adjusting the abutment stud relative to the cutter and toward and away from the pipe, said adjusting means comprising a screw disposed parallel to the stud and having screw-threads of the same hand but different pitch on its opposite ends, one end of the screw being engaged within a threaded bore in the abutment and the other end of the screw being engaged within an aligned threaded bore in a part of the cutter support.

22. Apparatus for forming an annular cut about a pipe which comprises a frame adapted to be mounted on the pipe, means on the frame for guidingly engaging the pipe, means for rotating the frame relative to the pipe, a cutter supported on the frame for engaging and cutting an annular zone of the pipe spaced inwardly from the end of the pipe, a cutter on the cutter support, and stop means on the frame substantially in alignment with the cutter longitudinally of the pipe adapted to be engaged by a transverse surface of the pipe to locate the cutter at a desired distance from the end of the pipe.

23. Apparatus as claimed in claim 22, wherein the stop means has a plurality of steps disposed at different distances axially of the pipe with respect to the cutter, and means to adjust the stop means selectively to present different steps of the stop means for engagement with said transverse surface of a pipe.

24. Apparatus as claimed in claim 23, comprising further stop means on the frame angularly displaced about the pipe from the location of the cutter, said further stop means being adapted to be engaged by the same transverse surface of the pipe as that engaged by the selected step of the first recited stop means.

25. Apparatus as claimed in claim 24, wherein the transverse surface of the pipe engaged by both stop means is an end surface of the pipe, and wherein the further stop means comprises a plurality of sets of further stop members, each set including at least one further stop member, the stop members of the respective set lying in the same transverse planes as the respective steps of the the first recited stop means.

26. Apparatus as claimed in claim 25, wherein the further stop means are fixed with respect to the frame, the apparatus is adapted to operate upon pipes having diameters lying within an appreciable size range, and wherein the stop members of a first set have their pipe engaging surfaces lying in a transverse plane closer to the cutter than the transverse plane of the stop members of a second set, the stop members of a first set being disposed to be engaged by the ends of pipes having diameters lying within the lower end of the said range of pipe diameters and to be received within and free from end engagement with pipes lying within the upper end of said range of pipe diameters, the stop members of a second set being disposed to be engaged by the ends of pipes lying within the said upper end of said range of pipe diameters.

27. Apparatus for forming an annular cut about a pipe which comprises a frame, means for mounting the frame on a pipe and for rotating it in a plane relative to the pipe about the axis of the latter, a cutter support in the form of a lever mounted on the frame and lying generally in a plane parallel to the plane of the annular cut to be made in the pipe, a cutting tool having a cutting edge disposed to engage the outer surface of the pipe, pivot means lying substantially in advance of the cutting tool in the direction of operative rotation of the frame relative to the pipe mounting the lever for oscillation about an axis parallel to the axis of rotation of the frame, and resilient means adapted to thrust the cutter support with the cutting tool mounted thereon in a tool feeding movement toward the pipe.

References Cited by the Examiner

UNITED STATES PATENTS

| 909,182 | 1/1909 | Hart. |
|---|---|---|
| 1,029,584 | 6/1912 | Berghausen. |
| 2,634,643 | 4/1953 | Krooss. |
| 2,753,739 | 7/1956 | Dreier. |

FOREIGN PATENTS

| 137,744 | 1/1903 | Germany. |

WILLIAM W. DYER, Jr., *Primary Examiner.*